(12) United States Patent
Hu

(10) Patent No.: US 8,565,673 B2
(45) Date of Patent: Oct. 22, 2013

(54) HIERARCHICAL NETWORKS UTILIZING FRAME TRANSMISSIONS PIPELINING

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1391 days.

(21) Appl. No.: 11/779,133

(22) Filed: Jul. 17, 2007

(65) Prior Publication Data
US 2008/0019423 A1 Jan. 24, 2008

Related U.S. Application Data

(60) Provisional application No. 60/807,727, filed on Jul. 19, 2006.

(51) Int. Cl.
*H04B 7/14* (2006.01)
(52) U.S. Cl.
USPC ............................... 455/15; 455/17; 370/315
(58) Field of Classification Search
USPC ............ 455/403, 422.1, 7, 11.1, 13.1, 16, 15, 455/17; 370/315
See application file for complete search history.

(56) References Cited

U.S. PATENT DOCUMENTS

| 6,115,376 | A * | 9/2000 | Sherer et al. | 370/389 |
|---|---|---|---|---|
| 7,072,611 | B2 * | 7/2006 | Shapira | 455/7 |
| 7,209,703 | B1 * | 4/2007 | Yarkosky | 455/9 |
| 2006/0280138 | A1 * | 12/2006 | Nanda et al. | 370/315 |
| 2007/0072604 | A1 * | 3/2007 | Wang | 455/428 |
| 2008/0002631 | A1 * | 1/2008 | Ramachandran | 370/338 |
| 2009/0073916 | A1 * | 3/2009 | Zhang et al. | 370/315 |

* cited by examiner

*Primary Examiner* — Vladimir Magloire
(74) *Attorney, Agent, or Firm* — Hogan Lovells US LLP

(57) ABSTRACT

A hierarchical WRAN includes a relay station (RS) possessing dual roles. A RS acts from the perspective of a base station (BS) as a consumer premise equipment (CPE) terminal just as any other first tier CPE terminal. Simultaneously, the RS, from the perspective of other second tier CPEs, acts as a BS providing all of the functional capabilities of a BS. The RS includes dual medium access control (MAC) functions in which a first MAC function serves to interface the RS with the BS while the second MAC function serves to interface the RS with the at least one CPE terminal. The RS further includes a convergence layer that maps, at the RS, the first MAC to the second MAC. The dual MAC capability of the RS enables the RS to pipeline frame transmission in both single and multi-channel operations.

36 Claims, 5 Drawing Sheets

HIERARCHICAL NETWORKS UTILIZING FRAME TRANSMISSIONS PIPELINING

RELATED APPLICATIONS

This application claims the benefit of U.S. Provisional Application No. 60/807,727, filed Jul. 19, 2006.

BACKGROUND OF THE INVENTION

1. Field of the Invention

Embodiments of the present invention relate, in general, to wireless hierarchical networks and particularly to hierarchical wireless regional area network networks using frame transmissions pipelining.

2. Relevant Background

The 802.22 wireless regional area network ("WRAN") system is aimed at providing broadband access with capabilities similar to the asymmetric digital subscriber line ("ADSL") and cable modem technologies over less populated rural areas. The typical range of such a system is limited based on transmitting power of a base station.

As is known to one skilled in the relevant art, a 802.22 system constitutes an 802.22 Media (or medium) Access Control ("MAC") and physical implementation in which at least one subscriber station communicates with a base station via a point-to-multipoint (P-MP) radio air interface. Services associated with such a communication are supported by the MAC and physical protocol layers. Typically radio communications within the above range can be possible in near- and non-line-of-sight situations between a base station and a subscriber station, also known as a customer premise equipment terminal. This line of sight operations however may include partial and even complete blockage by foliage or other obstacles which will in many situations contribute to signal attenuation and multi-path effects. Deployment configurations of 802.22 networks also include the optional use of macro diversity, i.e. optimization through the use of repeaters or relay stations.

An 802.22 system generally consists of one base station radio and one or more Consumer Premise Equipment ("CPE") radios. In such a system the base station ("BS") is radiating its downstream signal (forward) toward the CPE's with a variety of antenna configurations including omni-directional, a shaped sector or optionally an adaptive array (spatial reuse) antenna, each attempting to achieve broad beam width to azimuthally "cover" a number of prospective subscribers.

Repeater stations augment the coverage of a WRAN by extending the base station's reach. Current relay stations simply pass on, or repeat the signal by acting as a dedicated signal repeater. This repeating can lead to self-interference of signals and excessive bandwidth utilization. Self-interference from the use of repeaters occurs since they typically use the same channels used by the BS and the CPE terminals. In general, there is an interference-throughput tradeoff resulting from the use of repeaters since self-interference would typically result in lower throughput. In addition, simply repeating a signal in an attempt to extend the coverage of one or more BSs increases transmission transition overhead. Repeater stations are also unable to effectuate handoffs between one BS and another in the event of a communication disruption. This disruption can be caused by a wireless microphone or TV broadcast.

SUMMARY OF THE INVENTION

Briefly stated, embodiments of the present invention involve hierarchical wireless regional area networks in which a relay station ("RS") fulfills a dual role. According to one embodiment of the present invention, a RS, from the perspective of a BS, acts as a CPE terminal just as any other CPE terminal within the operational range of the BS. Simultaneously, the RS, from the perspective of other CPEs, acts as a BS providing all of the functional capabilities of a BS. Assuming that the RS is within range of multiple BSs during a communication disruption, the RS of the present invention can effectuate a handoff or hand-over of services from one BS to another in a seamless fashion.

According to one embodiment of the present invention, a hierarchical WRAN system is provided that includes a BS and at least one CPE terminal. Interposed between and in functional communication with the BS and the at least one CPE terminal is a RS. The relay station, according to one embodiment of the present invention, includes dual medium access control functions. A first MAC function serves to interface the RS with the BS while the second MAC function serves to interface the RS with the at least one CPE terminal. The RS further includes a convergence layer that maps at the RS the first MAC to the second MAC.

According to another aspect of the present invention links established and maintained between the RS and the BS, and between the RS and the CPE terminal(s) are independent of each other. This independence includes sensing or monitoring of the link as well as ranging and channel sounding.

The exchange of signals between a BS and at least one CPE terminal, via a RS, according to one embodiment of the present invention, can occur via either single or multiple channel operations. Frame pipelining enables the RS to simultaneously transmit signals to both the BS and the CPE terminal(s) as well as separately receive simultaneously from the BS and CPE terminals.

When only a single channel is available for signal exchange, and according to one embodiment of the present invention, a request is initiated by the RS to the BS seeking a bandwidth request. Responsive to receiving such a request, the BS responds with a bandwidth allocation and two multi-channel access protocols. The first multi-channel access protocol enables overlapping relay station transmissions to the BS and the CPE terminal(s) and the second multi-channel access protocol enables overlapping relay station reception of signals from the BS and the CPE terminal(s).

Once received the RS converts the first multi-channel access protocol according to the MAC associated with the CPE terminals and thereafter transmits the converted protocol to the CPE terminal(s).

The features and advantages described in this disclosure and in the following detailed description are not all-inclusive, and particularly, many additional features and advantages will be apparent to one of ordinary skill in the relevant art in view of the drawings, specification, and claims hereof Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
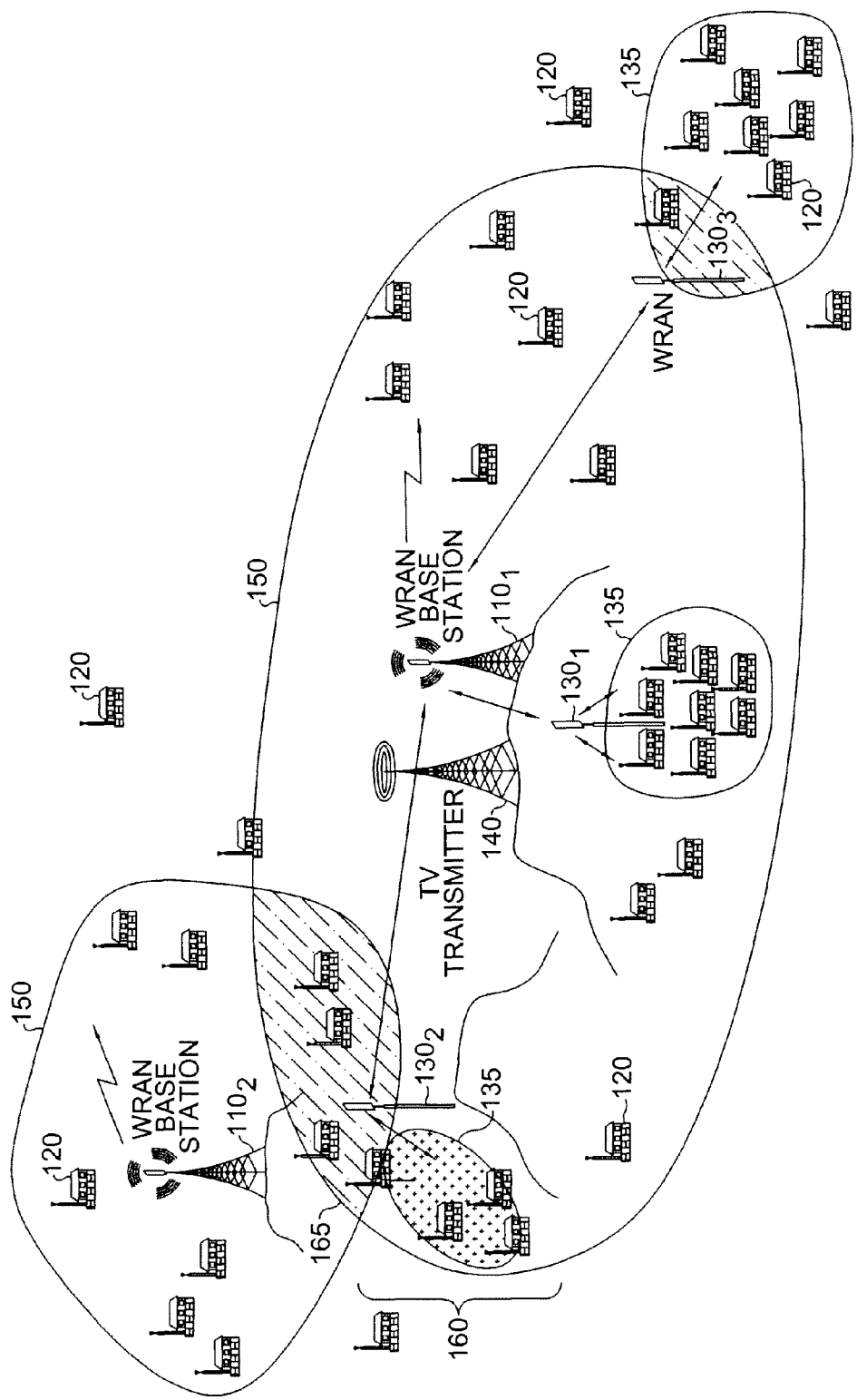
FIG. 1 shows a wireless regional area network utilizing relay stations operating in a dual role according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

A hierarchical wireless regional area network using pipelining frame transmissions is hereinafter described. According to various embodiments of the present invention a dual MAC enabled relay station is interposed between a BS and at least one consumer premise equipment terminal(s). The dual MAC functionality of the relay stations enables each relay station to be viewed as a CPE from the BS perspective while simultaneously being viewed as a BS to second hierarchical CPEs. In addition to this hierarchical structure, the present invention includes a MAC frame scheduling method to pipeline frame transmissions throughout the WRAN.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

FIG. 1 shows a wireless regional area network utilizing relay stations 130 operating in a dual role according to one embodiment of the present invention. According to one embodiment of the present invention one or more relay stations $130_{1,2...n}$ are associated with one or more WRAN base stations $110_{1,2,...m}$. Each BS 110 and/or RS 130 services at least one CPE terminal $120_{1,2,...p}$ using wireless connections. Typically the base station $110_{1,2,...m}$ serves as a portal or access point to an external wired network.

According to one embodiment of the present invention, a first level of hierarchy is established between a BS 110 and one or more relay stations 130. At this same level of hierarchy the BS 110 may establish links between one or more CPEs within the coverage area of that BS 110. Every node of the BS 110 is, from the BSs perspective, a CPE 120. The second level of hierarchy is between members of the first level of hierarchy that possess children nodes themselves. These are deemed RS 130.

FIG. 1 depicts two BSs $110_1$, $110_2$ with each BS being associated with several CPEs 120. The BS $110_1$ central to FIG. 1 is shown to be associated with three relay stations $130_1$, $130_2$, $130_3$. The ovals surrounding the BSs 110 and the relay stations 130 depict the area of coverage of each respectively. For example each relay station's $130_1$, $130_2$, $130_3$ area of coverage is represented by a small oval 135 while each BS's area of coverage 150 is considerably larger.

The area serviced by a BS 110 is conditioned on many factors. Certainly the output power of the BS 110 is a primary factor but so too is the topography surrounding the BS 110 antenna as well as the density of CPEs 120 within the coverage area 150. The three RSs $130_1$, $130_2$, $130_3$ shown in FIG. 1 depict three differing scenarios of coverage. As one skilled in the art will recognize these depictions are by way of example and other scenarios similarly affecting the coverage of the BS 110 are possible and are equally contemplated by the present invention.

Rarely is the topography of a WRAN not significant. As shown in FIG. 1, an obstruction can screen the line-of-sight coverage from a BS even when the BS's 110 location is relatively close. As shown in FIG. 1 a hill creates a sector 160 that possesses a void coverage area with respect to the BS $110_1$. Such an obstruction can be physical such as a hill, mountain, or building(s) but can also be electronic such as may occur from interference from other transmitters 140 along the same azimuth.

The result of either the interference from other transmissions 140 or from a topographical barrier to the line-of-sight requirement is an area 160 that is void of any wireless network connectivity. According to one embodiment of the present invention a relay station $130_2$ is positioned so that is possesses both a line-of-sight connection with the BS $110_1$ and with the CPEs 120 that operate with the coverage void sector 160.

When the signal attenuation or blockage is caused by signal interference, and according to another embodiment of the present invention, the link between the relay station $130_2$ and the BS $110_1$ can be on a channel that is de-conflicted with the transmission emanated from the interfering antenna 140. Alternatively a directional antenna can be used to focus the link between the BS $110_1$ and the relay station $130_2$ so as to eliminate the interference entirely.

According to one embodiment of the present invention, each relay station includes a dual MAC capability. The CPEs 120 present in the area of void coverage 160 view the relay station $130_2$ as a BS. At the same time, the BS $110_1$ views the relay station $130_2$ as a peer CPE 120. Each relationship is based on separate and independent MAC protocols. The link established between the relay station $130_2$ and the BS $110_1$ is independent of the link between the relay station $130_2$ and each CPE within the relay station's coverage area 135.

Similarly a relay station $130_3$ can be used to extend the range of a BS's $110_1$ coverage area 150 in situations where additional BSs are either unavailable or infeasible. Many of the CPEs 120 associated with the coverage area of the rightmost relay station $130_3$ are outside the coverage area of the BS $110_1$. Even those within the coverage area 150 may find the signal from the BS $110_1$ attenuated by the distance from the BS $110_1$ such that operational serviceability is questionable. In such a situation the relay station $130_3$ can extend the coverage of the BS $110_1$.

Relay stations $130_1$ are also utilized in areas of high CPE 120 density. In such scenarios the relay station $130_1$ can facilitate local connections between CPEs 120 within the coverage area 135 of the relay station $130_1$ that do not require an external network connection. Congestion control, flow control and general load balancing are features of the relay station according to embodiments of the present invention. Furthermore, such use of local relay stations $130_1$ enables CPEs serviced by that relay station $130_1$ to be relatively low power thus reducing interference. These and other embodiments of the roles of relay stations as would be known by one skilled in the art in a WRAN are contemplated by the present invention.

As each RS 130 within the WRAN is viewed by each BS 110 as a CPE, one embodiment of the present invention enables the relay station 130 to possess a hand-over capability from one BS $110_1$ to another BS $110_2$. The coverage area of the two BSs $110_1$, $110_2$ shown in FIG. 1 possess a coverage area overlap 165. According to one embodiment of the present invention, a relay station $130_2$ that is within the service coverage area of both BSs $110_1$, $110_2$, i.e. the overlap area 165, can effectuate a hand-over should the link between the relay station $130_2$ and its primary BS $110_1$ be interrupted. Consider for example interference from the TV transmitter 140 that degrades the link between the relay station $130_2$ and its primary BS $110_1$. Just as a CPE would search and find other BSs in which it can establish a link, the affected relay station $130_2$ can switch to a second BS $110_2$ and continue to provide service to the CPEs 120 within its service area 135.

From the second BS's $110_2$ perspective, the relay station $130_2$ is simply another CPE 120 within its coverage area 150. Upon loss of the link to its primary BS $110_1$, the relay station $130_2$ identifies and establishes a new link with the second BS $110_2$. Similarly the CPEs 120 within the relay station's $130_2$ coverage area 135 are unaffected by the loss of signal from the primary BS $110_1$. From their perspective the hand-over is seamless.

Figure 2:
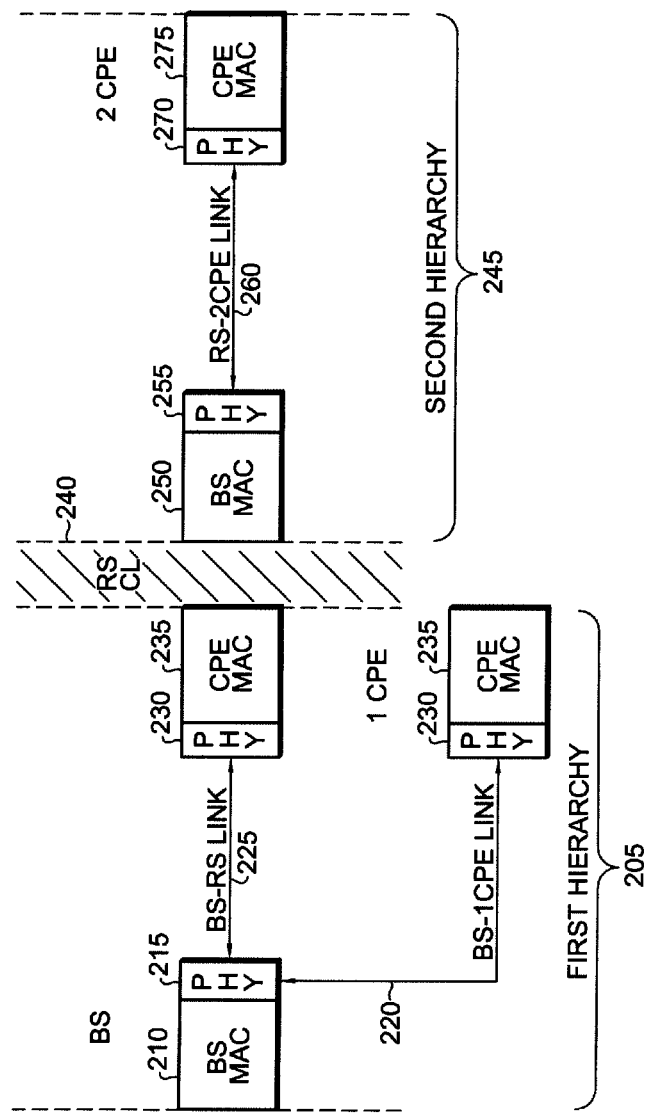
FIG. 2 depicts a relational portrayal of the links between a first and second hierarchy of base stations, relay stations and consumer premise equipment terminals of a wireless regional area network according to one embodiment of the present invention.

According to one embodiment of the present invention, and as previously mentioned, each RS 130 possesses dual MAC functionalities. These dual MAC functions reflect the RS's 130 dual role in a hierarchical WRAN. FIG. 2 shows a relational portrayal of the links between the first and second hierarchy of BSs, relay stations and consumer premise equipment terminals of a WRAN according to one embodiment of the present invention.

Beginning at the left most portion of the FIG. 1, a BS MAC 210 and physical layer ("PHY") 215 is used to establish a link 220, 225 between the BS and the one or more CPEs in the WRAN. When the link is established to a CPE, a BS-1CPE 220 link is established indicating that a first hierarchical link between a BS and a CEP is generated. In situations of a relay station a BS-RS link 225 is established. In both situations the PHY 230 and the CPE MAC 235 of the link are identical. Thus from the BS's perspective two independent links have been created to two separate CPEs. These first links comprise the first hierarchical layer 205 of the present invention.

According to one embodiment of the present invention and with further reference to FIG. 2, the RS maps the CPE MAC 235 of the BS-RS link 225 to enable a RS-2CPE link 260. Each RS includes a convergence layer (also referred to herein as a convergence sub-layer) that maps the BS MAC to a CPE MAC. According to one embodiment of the present invention, the PHY 230 and CPE MAC 235 of the BS-RS link 225 is mapped via the convergence layer 240 to generate a BS MAC 250 and associated PHY 255 originating from the RS. The new MAC and PHY generates a RS-2CPE link 260 to the PHY 270 and CPE MAC 275 of the second tier CPE. This second link generation represents the second hierarchy 245 of the present invention.

Each of the aforementioned links (BS-RS, BS-1CPE, and RS-2CPE) are independent of one another. Accordingly the maintenance of these links is also independent. Link maintenance includes, according to one embodiment of the present invention, ranging, channel sounding and the like. According to another aspect of the present invention link monitoring, including channel sensing and dynamic channel selection, is also managed independently for each link. This link independence enables each relay station to function beyond the role typically associated with a signal repeater and facilitates flexibility, scalability in hand-offs to other base stations, and traffic scheduling (load balancing).

Another aspect of the present invention is MAC frame transmission pipelining. Frame pipelining minimizes system idle time and maximizes bandwidth utilization. As can be appreciated by one skilled in the art, a relay or repeater station operating on a single channel cannot simultaneously transmit and receive. Thus after a RS has received a signal from a BS, its receiver is idle while it retransmits that signal. The present invention reduces that idle period by employing frame pipelining. Pipelining further minimizes transmission to reception transition overhead as there are no such transitions within any download/upload sub frame. To better understand the advantage of MAC frame pipelining according to the present invention consider the single iteration shown in FIG. 3.

Figure 3:
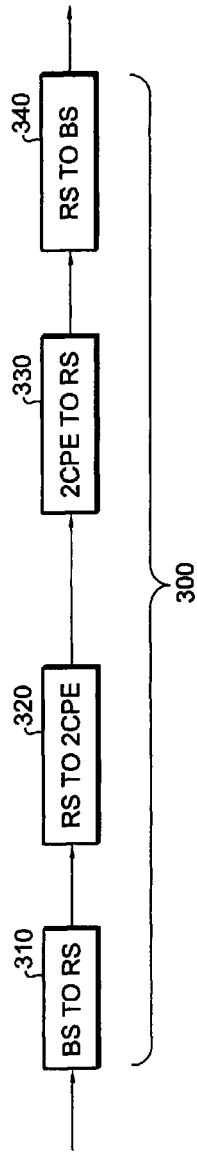
FIG. 3 is a high level block diagram showing one iteration of signal exchanges between a base station, a relay station and at least one consumer premise equipment terminal, according to one embodiment of the present invention.

FIG. 3 is a high level block diagram showing one iteration 300 of the four stage flow of signal exchanges between a BS, a relay station and at least one CPE terminal, according to one embodiment of the present invention. Moving left to right, a signal originating from an external network or similar external source is directed from the BS to a second hierarchical CPE (2CPE). Upon reaching the BS the signal is conveyed from the BS to the RS 310 (stage 1) and thereafter from the RS to the 2CPE 320 (stage 2). A reply to the signal is generated that is conveyed from the 2CPE to the RS 330 (stage 3) and thereafter from the RS to the BS 340 (stage 4). This flow of signals is a typical iteration. Note that in this flow of signal exchange the RS receives signals from either the BS or the 2CPE separately. Similarly the RS separately transmits signals to either the 2CPE or the BS.

Figure 4:
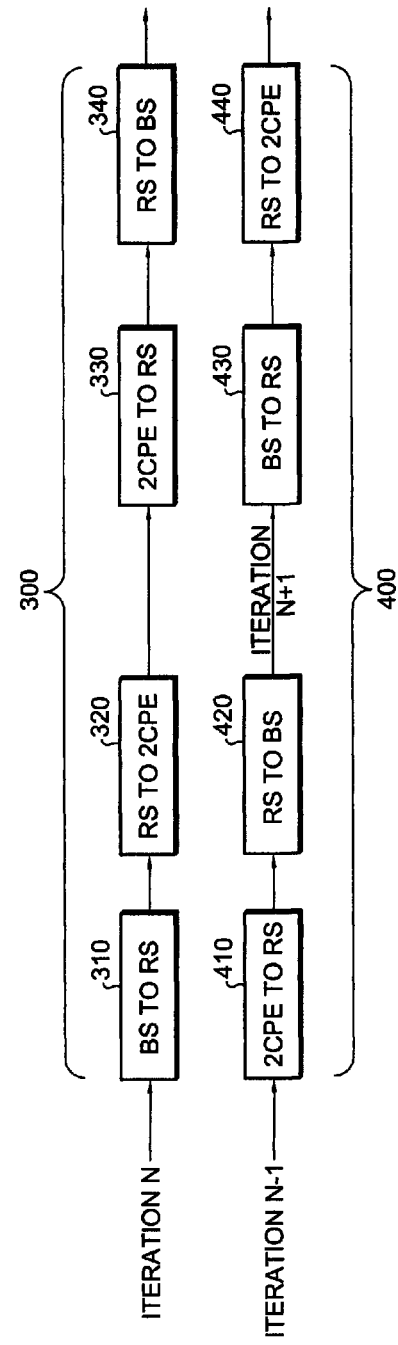
FIG. 4 is a high level block diagram depicting overlapping signal exchanges between a base station, a relay station, and at least one consumer premise equipment terminal, according to one embodiment of the present invention.

According to one embodiment of the present invention, bandwidth utilization can be maximized by minimizing system idle time. Pipelining takes advantage of the RS dual MAC and dual antenna capability so as to overlap operations of this four stage signal exchange process. FIG. 4 is a high level block diagram depicting overlapping signal exchanges between a BS, a relay station, and at least one CPE terminal, according to one embodiment of the present invention. As in FIG. 3, iterations of signal exchanges are shown chronologically as they move from left to right on the Figure. FIG. 4 shows the iteration at time period N 300 of signal exchanges first depicted in FIG. 3 overlapping a second iteration 400 of signal exchanges beginning at N−1 and continuing through iteration N+1.

The second flow of signal exchanges 400 is offset so as to minimize system idle time and transmission to reception transition overhead. The second flow of signal exchanges 400 is offset so as enable simultaneous transmissions and receptions by the RS. As the signal is transmitted from the BS to the RS 310 (stage 1) in the first flow 300, the RS also receives messages from the 2CPE as shown in the 2CPE to RS block 410 (stage 3). In such a manner the RS is receiving messages from both the BS and the 2CPE thus reducing its idle time. Thereafter as the RS transmits to 2 CPE 320 in stage 2 of the first signal exchange flow 300, the RS completes the N−1 iteration by transmitting to the BS in block 420 (stage 4). Similarly the reply by the 2CPE to the RS in block 330 of iteration N (stage 3) is mirrored by the BS to RS 430 (stage 1) transmission of yet another iteration (N+1) of the signal exchange. And as iteration N is completed by the RS to BS transmission 340 (stage 4), iteration N+1 is conveying signals from the RS to the 2CPE at block 440 (stage 2).

Frame pipelining of the present invention exploits the dual MAC and dual antenna capability of the RS. In one embodiment of the present invention, every transmission stage is assigned to either a down-link ("DL") sub-frame or an up-link ("UL") sub-frame, such that within an individual sub-frame only transmission or receptions are performed. No transmission-reception transmission occurs at the RS thus transmission-reception transition overhead is minimized.

According to another aspect of the present invention, self-interference in the RS is minimized while data transmission is conducted towards the WS and 2CPEs simultaneously. By applying frame pipelining and according to embodiments of the present invention, simultaneous transmit-receive and receive-receive on the same frequency are avoided at the RS eliminating self-interference.

This type of frame pipelining can, according to the present invention, be accomplished using single channel operations or using multiple channel operations.

Dual or multiple channel frame pipelining is accomplished by utilizing one channel for signal exchanges between the BS and the RS/1CPEs while a second channel is utilized for signal exchanges between the RS and the 2CPEs. Single channel operations however require a more intricate view of frame scheduling.

Figure 5:
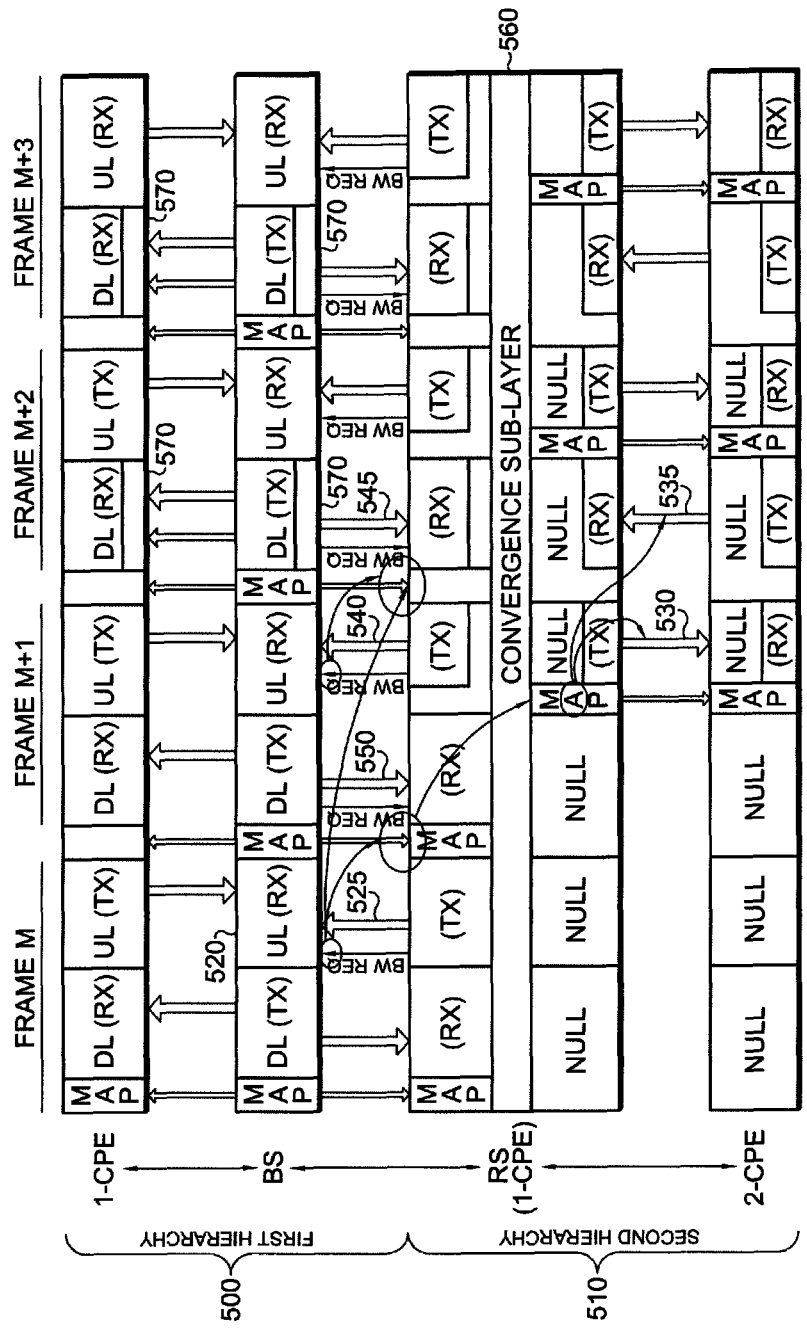
FIG. 5 is a high level block diagram showing frame transmissions between a base station, a relay station and at least one consumer premise equipment terminal utilizing single channel operations in a wireless regional area network, in accordance with one embodiment of the present invention.

FIG. 5 is a high level block diagram showing frame transmissions between a BS, a relay station and at least one CPE terminal utilizing a single channel operation in a wireless regional area network, in accordance with one embodiment of the present invention. Shown in FIG. 5 are several iterations of the four stages signal exchange previously discussed along with a more detailed view of sub-frame operations.

Represented in FIG. 5 is a first level of hierarchy 500 including a BS, a first hierarchy CPE and a RS acting in its additional role as a 1CPE. Also shown is a second level hierarchy 510 that includes a 2CPE. In order to enable pipelining, the RS in iteration N−2 transmits to the BS in the up-link sub-frame 520 a bandwidth request 525. This request is for bandwidth to be utilized in nitration N for the RS-to-2CPE 530 and 2CPE-to-RS 535 transmissions. These two transmissions overlap the RS-to-BS transmission 540 of iteration N−1 and the BS-to-RS 545 transmission of iteration N+1.

Upon receiving the bandwidth request 525 from the RS in iteration N−2 (shown in frame M), the BS accomplishes, in one embodiment of the present invention, three tasks. First the BS generates the multi-channel access protocol ("MAP") for the next frame, M+1. It is the UL sub-frame of frame M that overlaps the RS-to-BS 540 transmission of iteration N−1 with the RS-to-2CPE transmission 530 of iteration N.

The BS also generates a MAP for frame M+2. In this frame the DL sub-frame (BS-to-RS/1CPE 545 transmission) is overlapped with the 2CPE-to-RS 535 transmission. These two MAPs are combined with a bandwidth allocation for the RS-to-2CPE 530 and 2CPE-to-RS 535 transmissions and thereafter returned to the RS in the BS-to-RS 550 transmission of iteration N.

Once the MAPs and the BW allocation information is received by the RS from the BS, and based on this information, the RS generates, using the convergence sub-layer 560 previously discussed, the MAP for the RS-to-2CPE 530 transmission and the 2CPE-to-RS 535 transmission. One should note that the DL/UP sub-frames of the RS-to-2CPE transmissions are synchronized and overlapped with the UP/DL sub-frames of the BS-to-RS/1CPE transmissions.

In order to avoid simultaneous reception of signals at the RS, the BS should not transmit to other 1CPEs on sub-channels that are allocated to 2CPE-to-RS transmissions. Thus that portion of sub-channels are not generally available to the BS for signal exchange on the first hierarchy level 500. This sub-channel allocation is identified in FIG. 5 by the boxes in the DL channel 570. However, and according to another embodiment of the present invention, the BS could perform data transmissions on those sub-channels in another sector in which the RS is not located by utilizing advanced directional antenna technology such that the channel can be fully utilized. One skilled in the art will also recognize that signal encoding such as TDMA can also be utilized to facilitate the use of single channel pipelining.

Figure 6:
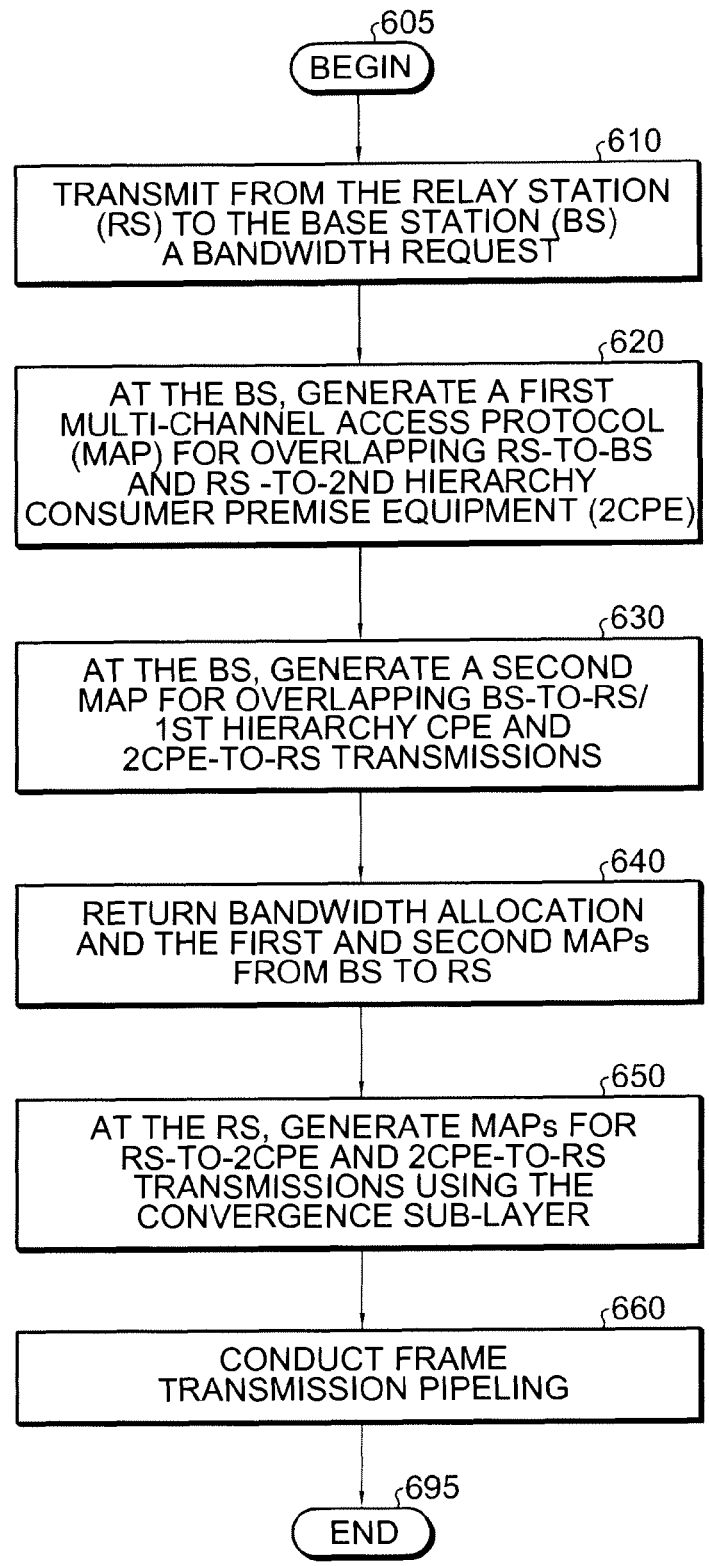
FIG. 6 is a flow chart showing one method embodiment according to the present invention for exchanging signals in a wireless regional area network having relay stations with a dual MAC capability.

FIG. 6 is a flow chart showing one method embodiment according to the present invention for exchanging signals in a wireless regional area network having relay stations with a dual MAC capability. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

In a single channel scenario of signal exchange between a BS, a RS and one or more CPEs in a multi hierarchy WRAN, one method embodiment according to the present invention begins 605 with the transmission of a bandwidth allocation request 610 from the RS to the BS. Upon receipt of the request, the BS generates a first 620 and a second 630 MAP for overlapping transmissions to and from the RS. The first MAP governs the overlapping of the RS-to-BS and RS-to-2CPE transmission while the second MAP governs the BS-to-RS and 2CPE-to-RS transmissions.

Once generated, these two MAPs are returned 640 to the RS along with a bandwidth (sub-channel) allocation for second level hierarchy transmissions. At the RS these MAPs, once received, are converted 650 from the first level MAC (controlling the first level hierarchy transmissions) to the second level MAC (controlling the second level hierarchy transmissions) using the convergence sub-layer at the RS.

Once converted, the first and second MAPs are conveyed to the 2CPEs so as to conduct 660 frame transmission pipelining. The process thereafter ends 695. As can be appreciated by one skilled in the art, each iteration can utilize a different sub-channel (bandwidth) allocation.

According to another embodiment of the present invention, frame transmission pipelining is also possible using multiple channels. The process operates as previously described however as a dedicated channel is available for the second hierarchy of transmissions (RS-to-2CPE and 2CPE-to-RS) there is no need to generate and convey sub-channel or bandwidth allocations requests and responses. Once a channel is selected for the second hierarchy a MAP is generated by the RS and used thereafter until a new channel is either required or identified. In such a scenario the first level hierarchy is able to fully utilize the entire spectrum of sub-channels for communicating with 1CPEs.

While the invention has been particularly shown and described with reference to a preferred embodiment and by way of example thereof, it will be understood by those skilled in the art that various other changes in the form and details may be made without departing from the spirit and scope of the invention.

As will be understood by those familiar with the art, the invention may be embodied in other specific forms without departing from the spirit or essential characteristics thereof Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

I claim:

1. In a wireless regional area network, a hierarchical system for transferring signals, said system comprising:
   a base station wherein said base station interfaces with an external network;
   at least one consumer premise equipment terminal; and
   a dual MAC and dual antenna relay station interposed between, and in wireless communication with, said base station and said at least one consumer premise equipment terminal, wherein said relay station includes a first medium access control function for interfacing with said base station and a second medium access control function different than the first medium access control function for interfacing with said at least one consumer premise equipment terminal,
   wherein no transmission-reception transmission occurs at the relay station thus transmission-reception transition overhead is minimized.

2. The hierarchical system of claim 1, wherein said relay station includes a convergence layer mapping the first medium access control function to the second medium access control function.

3. The hierarchical system of claim 1 further comprising a first link between said base station and said relay station and a second link between said relay station and said at least one consumer premise equipment terminal, and wherein said first link and said second link are maintained independent of one another.

4. The hierarchical system of claim 3 wherein maintenance of said first link and said second link includes ranging and channel sounding.

5. The hierarchical system of claim 3 wherein channel sensing and channel selection of said first link and said second link are managed independent of one another.

6. The hierarchical system of claim 1 wherein transferring signals from said base station to said at least one consumer premise equipment terminal via said relay station employs pipelining frame transmissions.

7. The hierarchical system of claim 6 wherein pipelining frame transmissions includes, at said relay station, simultaneous signal reception from said base station and from said at least one consumer premise equipment terminal.

8. The hierarchical system of claim 6 wherein pipelining frame transmissions includes, at said relay station, simultaneous signal transmissions to said base station and to said at least one consumer premise equipment terminal.

9. The hierarchical system of claim 6 wherein responsive to single channel availability, pipelining frame transmissions includes, at said relay station, transmitting to said base station a bandwidth request for bandwidth use in subsequent relay station transmissions to and receptions from said at least one consumer premise equipment terminal overlapping with subsequent relay station transmissions to and receptions from said base station respectively.

10. The hierarchical system of claim 6 wherein responsive to single channel availability, pipelining frame transmissions includes, at said base station, receiving from said relay station a bandwidth request so as to overlap pipelining transmissions and wherein responsive to receiving said bandwidth request said base station generates and transmits to said relay station a bandwidth allocation, a first multi-channel access protocol for overlapping relay stations transmissions, and a second multi-channel access protocol for overlapping relay station receptions.

11. The hierarchical system of claim 10 wherein responsive to receiving from said base station said bandwidth allocation and said first multi-channel access protocol, said relay stations converts said first multi-channel access protocol for overlapping relay stations transmissions according to said second medium access control function and transmits said converted said first multi-channel access protocol to said at least one consumer premise equipment terminal.

12. A computer implemented method for exchanging signals in a hierarchical wireless regional area network, the method comprising:
   receiving at a base station a bandwidth request from a relay station so as to overlap transmission and reception of signals and wherein responsive to receiving said bandwidth request said base station generates and transmits to said relay station a bandwidth allocation, a first multi-channel access protocol for overlapping relay station transmissions to said base station and to at least one consumer premise equipment terminal, and a second multi-channel access protocol for overlapping relay station receptions from said base station and said at least one consumer premise equipment terminal; and responsive to receiving from said base station said bandwidth allocation and said first multi-channel access protocol according to a first medium access control function for interfacing with said base station, said relay station converts said first multi-channel access protocol for overlapping relay stations transmissions according to a second medium access control function for interfacing with said at least one consumer premise equipment terminal and transmits said converted said first multi-channel access protocol to said at least one consumer premise equipment terminal, wherein the relay station is interposed between, and in wireless communication with, said base station and said at least one consumer premise equipment terminal, wherein said relay station includes said first medium access control function for interfacing with said base station and said second medium access control function different than the first medium access control function for interfacing with said at least one consumer premise equipment terminal, and wherein the relay station comprises dual antenna capability such that no transmission-reception transmission occurs at the relay station thus transmission-reception transition overhead is minimized.

13. The computer implemented method of claim 12 wherein said relay station includes a convergence layer mapping said first medium access control function to said second medium access control function.

14. The computer implemented method of claim 12 further comprising establishing a first link between said base station and said relay station and establishing a second link between said relay station and said at least one consumer premise equipment terminal, and wherein said first link and said second link are maintained independent of one another.

15. The computer implemented method of claim 12 wherein exchanging signals includes, at said relay station, simultaneous signal reception from said base station and from said at least one consumer premise equipment terminal.

16. The computer implemented method of claim 12 wherein exchanging signals includes, at said relay station, simultaneous signal transmissions to said base station and to said at least one consumer premise equipment terminal.

17. The computer implemented method of claim 12 wherein said bandwidth request and said bandwidth allocation is responsive to single channel availability.

18. A method for exchanging signals via frame pipelining in a hierarchical wireless regional area network, said network including a base station, at least one consumer premise equipment terminal and, interposed between said base station and said at least one consumer premise equipment terminal, a relay station, said method comprising:

establishing a first link between said base station and said relay station and a second link between said relay station and said at least one consumer premise equipment terminal, wherein said first link is based on a first medium access control function and said second link is based on a second access control function different than the first medium access control function and wherein said first link and said second link are maintained independent of one another;

at said relay station, receiving simultaneously signals from said base station and from said at least one consumer premise equipment terminal; and at said relay station, transmitting simultaneously signals to said base station and to said at least one consumer premise equipment terminal, wherein said receiving and said transmitting occur separately and wherein no transmission-reception transmission occurs at the relay station, whereby transmission-reception transition overhead is minimized.

19. The method of claim 18 further comprising at said relay station mapping the first medium access control function to the second medium access control function.

20. In a wireless regional area network, a relay station interposed between, and in wireless communication with, a base station and at least one consumer premise equipment terminal; said relay station comprising:

at least two signal receiving devices;
at least two signal transmitting devices;
a first medium access control function for interfacing with said base station via a first of said at least two signal receiving devices and a first of said at least two signal transmitting devices; and
a second medium access control function different than the first medium access control function for interfacing with said at least one consumer premise equipment terminal via a second of said at least two signal receiving devices and a second of said at least two signal transmitting devices,
such that no transmission-reception transmission occurs at the relay station thus transmission-reception transition overhead is minimized.

21. The relay station of claim 20, further comprising a convergence layer mapping the first medium access control function to the second medium access control function.

22. The relay station of claim 20, wherein a first link between said base station and said relay station and a second link between said relay station and said at least one consumer premise equipment terminal is maintained independent of one another.

23. The relay station of claim 20 wherein the at least two signal receiving devices are capable of receiving signals simultaneously from said base station and from said at least one consumer premise equipment terminal.

24. The relay station of claim 20 wherein the at least two signal transmitting devices are capable of transmitting signals simultaneously to said base station and to said at least one consumer premise equipment terminal.

25. The relay station of claim 24 further comprising a frame pipelining capability, and responsive to single channel availability, said frame pipelining capability includes transmitting to said base station a bandwidth request for bandwidth use in transmissions to and receptions from said at least one consumer premise equipment terminal overlapping with transmissions to and receptions from said base station respectively.

26. The relay station of claim 25 wherein said frame pipelining capability includes receiving from said base station a bandwidth allocation responsive to said bandwidth request and further receiving from said base station a first multi-channel access protocol for overlapping relay stations transmissions, and a second multi-channel access protocol for overlapping relay station receptions.

27. The relay station of claim 26 wherein said frame pipelining capability converts said first multi-channel access protocol for overlapping relay station transmissions according to said second medium access control function and transmits said converted said first multi-channel access protocol to said at least one consumer premise equipment terminal.

28. A computer implemented method for relaying signals in a hierarchical wireless regional area network wherein said wireless regional area network includes a relay station interposed between, and in wireless communication with, a base station and at least one consumer premise equipment terminal, the method comprising:

receiving at said relay station a first signal from said base station according to a first multi-channel access protocol;

receiving at said relay station a second signal from said consumer premise equipment terminal according to a second multi-channel access protocol wherein said first signal and said second signal are received at said relay station simultaneously, wherein said first multi-channel access protocol is based on a first medium access control function resident on said relay station and said second multi-channel access protocol is based on a second medium access control function different than the first medium access control function resident on said relay station, and wherein the relay station comprises dual antenna capability such that no transmission-reception transmission occurs at the relay station thus transmission-reception transition overhead is minimized.

29. The computer implemented method of claim 28 further comprising, at said relay station, mapping said first medium access control function to said second medium access control function.

30. The computer implemented method of claim 29 further comprising;

transmitting at said relay station a third signal to said base station according said first multi-channel access protocol; and transmitting at said relay station a forth signal to said consumer premise equipment terminal according to said second multi-channel access protocol wherein said second signal and said forth signal are transmitted at said relay station simultaneously.

31. The computer implemented method of claim 28 further comprising, at said relay station, pipelining signal transmissions and signal receptions.

32. The computer implemented method of claim 28 further comprising, at said relay station, establishing a first link to said base station and establishing a second link to said at least one consumer premise equipment terminal, and wherein said first link and said second link are maintained independent of one another.

33. The wireless regional area network of claim 1, wherein every transmission stage is assigned to either a down-link ("DL") sub-frame or an up-link ("UL") sub-frame, such that within an individual sub-frame only transmission or receptions are performed.

34. The method of claim 12, wherein every transmission stage is assigned to either a down-link ("DL") sub-frame or an up-link ("UL") sub-frame, such that within an individual sub-frame only transmission or receptions are performed.

35. The wireless regional area network of claim 20, wherein every transmission stage is assigned to either a down-link ("DL") sub-frame or an up-link ("UL") sub-frame, such that within an individual sub-frame only transmission or receptions are performed.

36. The method of claim 28, wherein every transmission stage is assigned to either a down-link ("DL") sub-frame or an up-link ("UL") sub-frame, such that within an individual sub-frame only transmission or receptions are performed.

* * * * *

UNITED STATES PATENT AND TRADEMARK OFFICE
CERTIFICATE OF CORRECTION

| | | |
|---|---|---|
| PATENT NO. | : 8,565,673 B2 | Page 1 of 1 |
| APPLICATION NO. | : 11/779133 | |
| DATED | : October 22, 2013 | |
| INVENTOR(S) | : Wendong Hu | |

It is certified that error appears in the above-identified patent and that said Letters Patent is hereby corrected as shown below:

In the Claims

Column 10, line 6, 2nd occurrence of "transmission" should be --transition--

Column 10, line 6, after "occurs" insert --during a sub-frame--

Column 11, line 32, 2nd occurrence of "transmission" should be --transition--

Column 11, line 32, after "occurs" insert --during a sub-frame--

Column 12, line 11, 2nd occurrence of "transmission" should be --transition--

Column 12, line 11, after "occurs" insert --during a sub-frame--

Column 12, line 34, 2nd occurrence of "transmission" should be --transition--

Column 12, line 34, after "occurs" insert --during a sub-frame--

Column 13, line 28, 2nd occurrence of "transmission" should be --transition--

Column 13, line 28, after "occurs" insert --during a sub-frame--

Signed and Sealed this
Eighteenth Day of February, 2014

Michelle K. Lee
*Deputy Director of the United States Patent and Trademark Office*